United States Patent
Smetana

(10) Patent No.: US 9,641,039 B2
(45) Date of Patent: May 2, 2017

(54) DRIVE DEVICE, ESPECIALLY FOR A VEHICLE, HAVING AN ELECTRIC DRIVE WITH A ROTOR SHAFT BEARING SYSTEM

(75) Inventor: Tomas Smetana, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 571 days.

(21) Appl. No.: 14/111,047

(22) PCT Filed: Mar. 5, 2012

(86) PCT No.: PCT/EP2012/053706
§ 371 (c)(1),
(2), (4) Date: Nov. 18, 2013

(87) PCT Pub. No.: WO2012/139821
PCT Pub. Date: Oct. 18, 2012

(65) Prior Publication Data
US 2014/0062229 A1    Mar. 6, 2014

(30) Foreign Application Priority Data

Apr. 13, 2011    (DE) .................. 10 2011 007 254

(51) Int. Cl.
*H02K 5/173* (2006.01)
*H02K 5/20* (2006.01)
(Continued)

(52) U.S. Cl.
CPC ............ *H02K 5/161* (2013.01); *F16C 35/06* (2013.01); *F16H 57/0476* (2013.01);
(Continued)

(58) Field of Classification Search
CPC  H02K 1/32; H02K 5/173; H02K 7/08; H02K 7/083; H02K 7/088; H02K 7/086; H02K 7/116; H02K 9/19
(Continued)

(56) References Cited

U.S. PATENT DOCUMENTS 4,311,932 A * 1/1982 Olson .................. H02K 9/19
310/59
4,480,206 A * 10/1984 Manson .............. F16C 35/063
310/90

(Continued)

FOREIGN PATENT DOCUMENTS

CN   201018351      2/2008
DE   19841159 C2    1/2000
(Continued)

OTHER PUBLICATIONS

Machine translation of WO 2012139820 A2.*
Machine translation of JP 2006166491 A.*

*Primary Examiner* — John K Kim
*Assistant Examiner* — Minki Chang
(74) *Attorney, Agent, or Firm* — Davidson, Davidson & Kappel, LLC

(57) ABSTRACT

A drive device having an electric drive. A drive device (1) includes at least one housing (15), at least one electric drive, the electric drive having a rotor arrangement with a rotor shaft (7) which is designed for rotation about a rotational axis (17), and a bearing arrangement (14 a, b) for mounting the rotor arrangement. The bearing arrangement (14 a, b) supports the rotor arrangement in relation to the rotational axis (17) radially inwardly, the bearing arrangement (14a, b) supporting the rotor shaft in relation to a support section (15, 16) that is fixed to the housing.

14 Claims, 2 Drawing Sheets

(51) Int. Cl.
   *H02K 7/116* (2006.01)
   *F16C 35/06* (2006.01)
   *F16H 57/04* (2010.01)
   *H02K 5/16* (2006.01)
   *H02K 5/22* (2006.01)

(52) U.S. Cl.
   CPC ....... *F16H 57/0483* (2013.01); *H02K 5/1732* (2013.01); *H02K 5/20* (2013.01); *H02K 5/22* (2013.01); *H02K 7/116* (2013.01)

(58) Field of Classification Search
   USPC ................................ 310/90, 401, 425, 83, 99
   See application file for complete search history.

(56) References Cited

U.S. PATENT DOCUMENTS

| | | | | |
|---|---|---|---|---|
| 6,707,180 B2* | 3/2004 | Hattori | ..................... | H02K 1/32 310/52 |
| 2004/0245875 A1* | 12/2004 | Furuse | ................ | F16C 33/6674 310/90 |
| 2005/0127778 A1* | 6/2005 | Arimitsu | ................ | H02K 16/02 310/266 |
| 2007/0252462 A1* | 11/2007 | Holmes | .................. | H02K 7/085 310/112 |
| 2009/0256437 A1* | 10/2009 | Miura | ..................... | H02K 5/225 310/71 |
| 2009/0257701 A1* | 10/2009 | Maeda | ..................... | B21K 1/04 384/548 |
| 2009/0313965 A1* | 12/2009 | McCutchan | .......... | F16C 19/163 60/39.01 |
| 2010/0317476 A1* | 12/2010 | Schoenek | ................ | B60K 6/26 475/5 |
| 2011/0181129 A1* | 7/2011 | Aso | ........................ | H02K 7/083 310/12.14 |
| 2012/0031691 A1* | 2/2012 | Fuechtner | ................ | B60K 1/00 180/65.6 |
| 2014/0066247 A1* | 3/2014 | Smetana | .................. | F16D 3/06 475/149 |

FOREIGN PATENT DOCUMENTS

| | | | | |
|---|---|---|---|---|
| DE | WO 2012139820 A2 * | 10/2012 | ............. | B60K 1/00 |
| JP | 2000035092 | 2/2000 | | |
| JP | 2006 166491 | 6/2006 | | |
| JP | 2006166491 A * | 6/2006 | | |
| JP | WO 2010038750 A1 * | 4/2010 | ............. | H02K 7/083 |

* cited by examiner

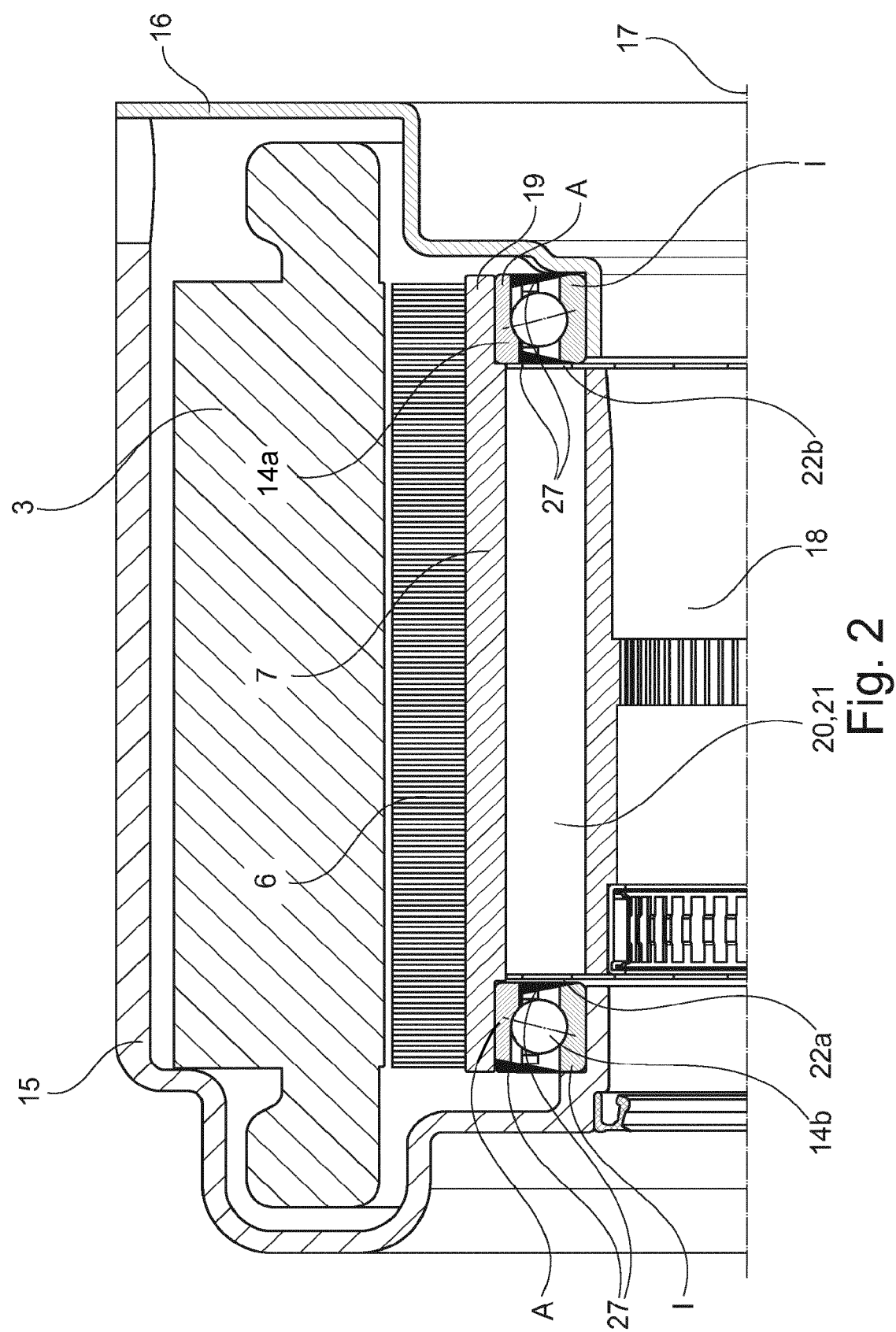

DRIVE DEVICE, ESPECIALLY FOR A VEHICLE, HAVING AN ELECTRIC DRIVE WITH A ROTOR SHAFT BEARING SYSTEM

The present invention relates to a drive device having at least one housing, at least one electric drive, the electric drive having a rotor system including a rotor shaft which is designed for rotation around a rotation axis, and having a bearing system for supporting the rotor system, the bearing system supporting the rotor system radially inwardly in relation to the rotation axis.

In industrial applications and, in particular, in automotive engineering, electric motors are frequently used to generate required driving torques. Thus, the trend in automobiles is toward replacing internal combustion engines with electric motors and generating the driving torques for the vehicles with the aid of the electric motors.

BACKGROUND

The electric motors customarily include rotor systems which are rotated around a rotation axis relative to stators with the aid of supplied electrical energy and generate the required driving torque in this way.

A drive concept of this type is shown, for example, in the publication DE 19841159 C2, which relates to a drive unit for a motor vehicle, which includes an electric motor having a stator and a rotor, the electric motor being situated coaxially to at least one of the drive shafts. The drive unit includes a rotor shaft which is supported radially outwardly via two ball bearings on supports fixed to a housing. In addition to the two ball bearings, the rotor shaft is supported with respect to a rotatable differential section via a needle bearing, the rotor shaft being supported radially inwardly via the needle bearing.

SUMMARY OF THE INVENTION

It is an object of the present invention to provide a novel concept for a drive device having an electric drive.

The present invention provides a drive device which is also suitable and/or designed for stationary applications, for example industrial application, but particularly preferably for a vehicle, specifically for generating a driving torque of the vehicle.

The drive device includes at least one housing which is usually designed in multiple parts, and which may possibly include multiple, even non-contiguous sections. In the case of a vehicle, the housing is situated in a stationary manner, possibly damped or sprung.

The drive device includes at least one electric drive, the electric drive, designed in particular as an electric motor, being suitable and/or designed for generating the driving torque. In addition to a stator, the electric drive includes a rotor system having a rotor shaft. The rotor system is particularly preferably designed as an inner rotor which is designed to be surrounded by the stator radially on the outside and for rotation around a rotation axis. The rotor shaft is rotatably fixedly coupled with a rotor; for example, the rotor is designed as a laminated rotor.

The drive device also includes a bearing system which is suitable and/or designed for supporting the rotor system, the bearing system supporting the rotor system radially inwardly with respect to the rotation axis. Forces which are introduced into the bearing system by the rotor system are thus diverted radially inwardly in the direction of the rotation axis.

In differentiation from the known prior art, it is proposed according to the present invention that the bearing system supports the rotor shaft with respect to a support section fixed to a housing. The support section is situated in a stationary manner with respect to the housing and is preferably designed to be connected to the housing. The support section may also form an integral part of the housing.

In particular, the bearing system is designed as the main bearing of the rotor shaft. Thus, if one compares the drive device according to the present invention with the aforementioned DE 19841159 C2, an inverse kinematics is proposed in the present case in relation to the main bearing, the rotor system being fixed on the bearing system radially farther to the outside than the support section. However, the needle bearing illustrated in DE 19841159 C2 is only a centering bearing and is supported, in particular, only with respect to a differential section, which also rotates and is thus not comparable to the bearing system according to the present invention.

Due to the novel design of the bearing system, structural flexibility exists in further designing the drive device, which is explained below in connection with the subclaims by way of example and without restriction.

In one particularly preferred specific embodiment of the present invention, the bearing system includes at least one inner ring device and at least one outer ring device, the rotor system being, in particular, rotatably fixedly coupled with the outer ring device and the support section being rotatably fixedly coupled with the inner ring device. This structural embodiment further substantiates the idea of the present invention that the rotor system is supported radially inwardly via the bearing system.

In one preferred refinement of the present invention, the bearing system includes two bearing devices which are situated at a distance from each other. The outer ring devices are particularly preferably pressed into the rotor shaft. Both bearing devices are designed to support the rotor shaft radially inwardly with respect to the support section fixed to the housing. In particular, the two bearing devices form the main bearing for the rotor shaft with respect to the housing.

In one preferred refinement of the present invention, the two bearing devices are situated on the end of the rotor shaft in the axial direction. Due to this embodiment, the rotor shaft is supported in the total axial extension; in particular, no shaft sections remain which project freely beyond the bearing devices.

In one possible refinement of the present invention, the bearing devices are situated in such a way that they overlap in the axial projection, in particular they overlap completely with the rotor shaft. Due to this possible embodiment, a very narrow radial extension of the rotor shaft is achieved.

In one possible refinement of the present invention, the rotor shaft has multiple channel sections which extend in the axial direction and are preferably distributed at regular intervals around the rotation axis in the circumferential direction and which are designed to cool the rotor shaft, in particular the bearing system or the bearing device. For this purpose, the channel sections are preferably open on both sides in the axial direction, so that the openings of the channel sections face the bearing devices. The drive device is advantageously designed to cool the rotor shaft and/or the bearing system and/or the bearing device by conducting gear oils from the drive device through the channel sections. When cooling the rotor shaft, the gear oil is particularly preferably guided in such a way that the gear oil is flushed around or on the bearing devices in contact therewith for the purpose of cooling the bearing devices directly with the lubricant. Clearances through which the gear oil is conducted are particularly preferably provided between the bearing devices and the channel sections. This arrangement and the clearances are facilitated from a structural point of view by the design of the bearing system according to the present invention.

In one preferred refinement of the present invention, the inner ring device of the bearing device is coupled with the motor housing or a motor plate of the motor housing of the drive unit. The motor housing preferably designates the housing for a closed chamber in which the stator and the rotor are situated and which is closed by the motor plate in the axial direction. The motor housing and the motor plate thus form the support sections fixed to the housing.

Structurally, it is particularly preferred if the stator and/or the rotor shaft is/are situated in or integrated entirely into the housing in the axial direction. As a result, the stator and the rotor may be effectively protected against gear oil and other interferences. The rotor shaft and motor housing furthermore form an easily handled structural unit.

In one particularly preferred embodiment of the present invention, the motor plate may be manufactured from die cast aluminum. However, it is preferred if the motor plate is implemented as a sheet metal molding. In this embodiment, the motor plate may have reinforcing beads or other reinforcements. Optionally, the motor plate is either soft or heat-treated (blank-hardened). The motor plate performs the functions of precisely positioning the rotor shaft in relation to the motor housing and another housing of the drive device, connecting the electric motor to the housing, and protecting the electric motor against external media, in particular gear oil from the transmission and processing media outside the drive device.

It is particularly preferred if the bearing devices are designed as rolling bearings, preferably as ball bearings. In this embodiment, the bearing devices continuously permit high rotational speeds of the rotor shaft, for example higher than 5,000 rotations per minute, in particular higher than 10,000 rotations per minute.

In one preferred refinement of the present invention, the rolling bearings are each preferably sealed on both sides by a sealing ring. Each sealing ring is rotatably fixedly connected to the outer ring system, in particular the outer ring, in such a way that the latter also rotates during a rotation of the rotor shaft and rests in a sealing and/or contacting manner on the inner ring system, in particular the inner ring.

This embodiment has the advantage that sealing lips of the sealing rings, which rest on the inner ring device, reduce the supporting force as a function of the rotational speed of the rotor shaft, due to the occurring centrifugal forces. In particular, the sealing rings may be designed to lift according to the rotational speed. While the sealing rings seal the rolling member chamber against, for example, grease discharge or gear oil penetration at low rotational speeds or while the rotor system is at a standstill, the preloading forces of the sealing ring between the sealing lip and the inner ring system, in particular the bearing inner ring, are reduced as the rotational speed of the rotor system increases, due to the effect of centrifugal force. This technical effect is also possible only due to the design of the bearing system according to the present invention.

In one preferred embodiment of the present invention, the pressure lines of the bearing devices, in particular the rolling bearings, are arranged in a circumferential configuration. The bearing system or the bearing device is particularly preferably preloaded in the axial direction.

In one preferred refinement of the present invention, the rotor shaft is designed as a hollow shaft, at least one shaft, which is rotatably fixedly coupled with the rotor shaft, being situated in the hollow shaft chamber. The shaft is particularly preferably coupled with the rotor shaft via at least one compensation interface which is designed to facilitate a change in the distance between the shaft and the rotor shaft in the axial direction. In other words, the shaft and the rotor shaft are decoupled from each other in relation to the axial direction, so that an axial shifting and/or axial movement between the shaft and the rotor shaft is facilitated, axial forces between the shaft and the rotor shaft not being transmitted or transmitted only in a damped manner. Due to this structural embodiment, the transmission of axial forces from the shaft to the rotor shaft is prevented, so that the O configuration is technically feasible.

In one preferred refinement of the present invention, the drive device is designed as an electric axle or a hybrid transmission for a vehicle. The hybrid transmission has at least two, preferably different motors, for example an electric motor and an internal combustion engine, for generating a driving torque for a vehicle.

In these embodiments, the drive device includes a gear section which is designed to translate and possibly gear up or gear down the driving torque on output shafts of the drive device. In particular, the gear section may include a planetary gear, preferably a spur wheel planetary gear. The gear section may also be designed as a differential. The electric motor, the rotor, the rotor shaft and possibly the gear section may be coaxially situated.

BRIEF DESCRIPTION OF THE DRAWINGS

Further features, advantages, and effects of the present invention result from the following description of a preferred exemplary embodiment of the present invention.

FIG. 2 shows a detailed enlargement from FIG. 1.

DETAILED DESCRIPTION

Figure 1:
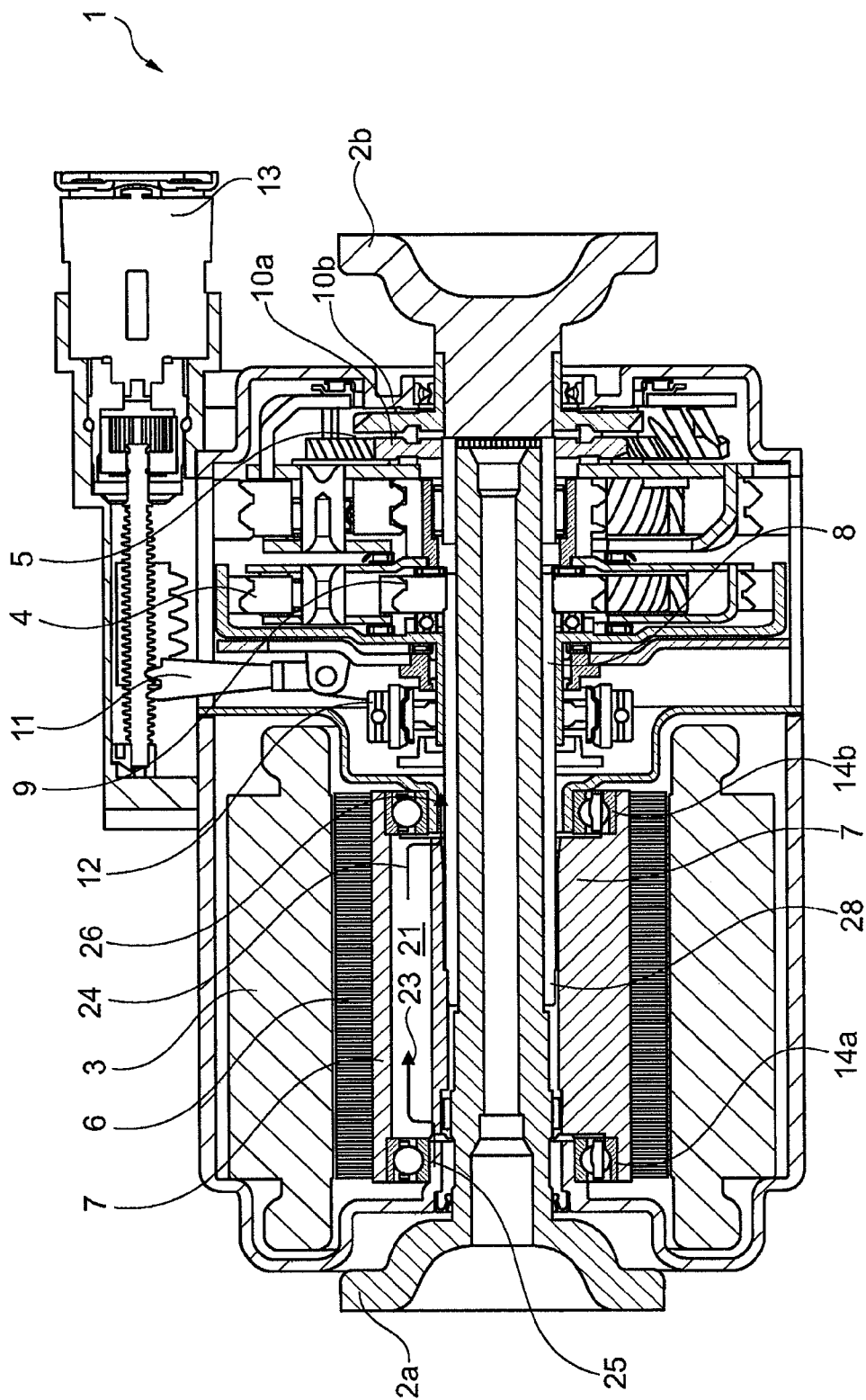
FIG. 1 shows a schematic longitudinal section of an electric axle as one first exemplary embodiment of the present invention.

FIG. 1 shows a schematic longitudinal sectional representation of an electric axle 1 as one exemplary embodiment of the present invention. Electric axle 1 includes two output shafts 2a, 2b, designed as full-floating axles, which transfer a driving torque generated by an electric motor 3 to the wheels of a vehicle. Electric axle 1 furthermore includes a planetary gear 4 which generates a translation, in particular a gearing up or gearing down, of the driving torque generated by electric motor 3 and conducts the driving torque to output shafts 2a, b via a differential section 5. Electric motor 3, output shafts 2a, b, planetary gear 4 and differential section 5 are situated coaxially to each other so that electric axle 1 is designed as a highly compact module.

The driving torque is transmitted from electric motor 3 via a rotor 6 to a rotor shaft 7 which is rotatably fixedly coupled with a sun shaft 8. Sun shaft 8 conducts the driving torque to a first sun wheel 9 which meshes with planetary wheels in planetary gear 4. The driving torque is supplied via planetary gear 4 to differential section 5, which transmits the translated driving torque to output shafts 2a, b via a second and a third sun wheel 10a, b. It should be emphasized, in particular, that rotor shaft 7, sun shaft 8 and first sun wheel 9 are situated coaxially and/or concentrically to each other. For the sake of completeness, it should be noted that planetary gear 4 is designed as a two-speed transmission which is switchable between two translation states via a gearshift fork 11 and an engagement bearing 12. The switching takes place via an actuator motor 13. Electric axle 1 is lubricated with gear oil, which is provided as splash lubrication.

For a more detailed description, reference is made to FIG. 2, which shows electric axle 1 in the same view but in a detailed enlargement and also having partially graphically suppressed components. In FIG. 2, the same parts are identified by the same reference numerals.

Rotor shaft 7 is supported on a bearing which includes two bearing devices 14*a*, *b*. Bearing devices 14*a*, *b* are designed as two preloaded angular ball bearings in an O configuration, so that rotor shaft 7 is supported without clearance. Rotor shaft 7 is situated on outer rings A of bearing devices 14*a*, *b*, while inner rings I of bearing devices 14*a*, *b* are fixed to the housing. Outer rings A are pressed into rotor shaft 7, for example. Left bearing device 14*a* is mounted together with inner ring I on a section of housing 15; right bearing device 14*b* is supported by its inner ring I on a motor plate 16. Motor plate 16 is designed, in particular, as a sheet metal molding which optionally has reinforcement structures.

Sealing rings 27 are inserted on both sides of bearing devices 14*a*, *b*, sealing rings 27 being rotatably fixedly coupled with the outer rings and rotating therewith during operation. Sealing rings 27 rest on inner rings I in a sealing and/or contacting manner, sealing rings 27 being designed to lift according to the rotational speed, so that the contact pressure on the inner rings decreases as the rotational speed increases. This has the advantage that the sealing effect, but also the friction, is greatest in the idle state of rotor shaft 7 and decreases as the rotational speed increases.

Rotor shaft 7 has a hollow shaft chamber 18 located coaxially and concentrically to its rotation axis 17, hollow shaft chamber 18 being designed—as is apparent from the preceding figure—to accommodate full-floating axles 2*a*, *b* (output shafts) as well as to accommodate sun shaft 8.

In the illustrated longitudinal section, rotor shaft 7 has a stepped design in the radial direction, a radially outer area 19 accommodating outer rings A of bearing device 14*a*, *b* or being rotatably fixedly coupled therewith, and an area located radially farther inward being reduced in the axial direction by the width of bearing device 14*a*, *b* as cooling area 20. Cooling bore holes 21, which are distributed at regular intervals around rotation axis 17 and which extend in the axial direction parallel to rotation axis 17, are introduced into cooling area 20. Cooling bore holes 21 are situated in such a way that they overlap with bearing devices 14*a*, *b* in the axial projection. The free diameter of cooling bore hole 21 is as wide as the width of bearing devices 14*a*, *b* in the radial direction.

In the illustrated longitudinal section, slots are provided between cooling area 20 of rotor shaft 7 and bearing devices 14*a*, *b*, and in the overall view, annular disks are provided as clearances 22*a*, *b*, which are open in the direction of hollow shaft chamber 18. A flow-related connection between hollow shaft chamber 18 and cooling bore holes 21 is thus established by clearances 22*a*, *b*, so that a gear oil is able to enter cooling bore holes 21 via clearances 22*a*, *b*.

Due to the use of cooling bore holes 21 in rotor shaft 7, the weight of rotor shaft 7 is reduced, on the one hand, and a cooling is implemented by the gear oil within rotor shaft 7, on the other hand.

A possible flow of the gear oil is represented by arrows 23, 24 in FIG. 1. The gear oil flows from an annular gap 25 between full-floating axle 2*a* and rotor shaft 7 or housing 15 via clearance 22*a* (FIG. 2) into cooling bore hole 21, crosses cooling bore hole 21 and cools rotor shaft 7 and bearing device 14*a* and then enters annular gap 26, which is situated between sun shaft 8 and motor plate 16, past bearing device 14*b* via clearance 22*b*, and cools bearing device 14*b*. In alternative specific embodiments, the direction of flow may also be reversed.

During operation, the stator of electric motor 3 is cooled to a temperature of maximal 55° C. with the aid of a water cooling system, which is not illustrated. The advantage of the cooling system described above is that a temperature gradient between the stator and rotor shaft 7 and bearing devices 14*a*, *b* is reduced.

A compensation interface 28, via which sun shaft 8 is rotatably fixedly coupled with rotor shaft 7, is situated in the axial area of electric motor 3 and/or centrally in relation to electric motor 3 or rotor shaft 7, viewed in the axial direction. Compensation interface 28 implements a form-fitting connection, for example a plug-in gearing, a spline or a polygonal gearing.

A torque flow may thus take place from electric motor 3 via rotor shaft 7, compensation interface 28, sun shaft 8 and first sun wheel 9.

It should be emphasized, in particular, that sun shaft 8 and rotor shaft 7 are situated in an axially shiftable manner in relation to each other in compensation interface 28. The axial shiftability has the technical effect that no axial forces may be transmitted between rotor 6 and first sun wheel 9 via the shaft system formed by sun shaft 8 and rotor shaft 7. However, axial forces of this type are diverted from first sun wheel 9 to housing 15 via additional intermediate elements and bearings. As a result, only torques are conducted via the form-fitting connection between rotor shaft 7 and sun shaft 8.

In addition, long and structurally required elastic sun shaft 8 facilitates a radial compensation of misalignments between electric motor 3 and planetary gear 4 of electric axle 1. Possible axial forces resulting from a helical gearing of planetary gear 4 are guided via another force path. As a result, bearing devices 14*a*, *b* do not experience any additional operating forces apart from the operating preloading.

LIST OF REFERENCE NUMERALS

1 Axle
2*a*, *b* Full-floating axles
3 Electric motor
4 Planetary gear
5 Differential section
6 Rotor
7 Rotor shaft
8 Sun shaft
9 First sun wheel
10*a*, *b* Second and third sun wheels
11 Gearshift fork
12 Engagement bearing
13 Actuator motor
14*a*, *b* Bearing devices
15 Housing
16 Motor plate
17 Rotation axis
18 Hollow shaft chamber
19 Radially outer area of rotor shaft
20 Cooling area
21 Cooling bore holes
22*a*, *b* Clearances 23 Arrow
24 Arrow
25 Annular gap
26 Annular gap
27 Sealing rings
28 Compensation interface

What is claimed is:

1. A drive device comprising:
   at least one housing; and
   at least one electric drive, the electric drive having a rotor system including a rotor shaft designed for rotation around a rotation axis, and having a bearing system for supporting the rotor system, the bearing system supporting the rotor system radially inwardly in relation to the rotation axis, the bearing system supporting the rotor shaft with respect to a support section fixed to the housing, the rotor shaft having a stepped design with a first radial inner surface having diameter larger that the bearing system to contact the bearing system, the rotor shaft having a radially inwardly projecting section with a second radial inner surface having a diameter smaller than the bearing system,
   wherein the rotor shaft is designed as a hollow shaft having a hollow shaft chamber, at least one shaft being situated in the hollow shaft chamber, the shaft being rotatably fixedly but axially shiftably coupled with the rotor shaft.

2. The drive device as recited in claim 1 wherein the bearing system has at least one inner ring device and at least one outer ring device, the rotor system being coupled with the outer ring device and the support section being coupled with the inner ring device.

3. The drive device as recited in claim 2 wherein the housing is a motor housing, the inner ring devices being coupled with the motor housing or a motor plate of the motor housing.

4. The drive device as recited in claim 3 wherein the rotor shaft is situated entirely in the motor housing in an axial direction.

5. The drive device as recited in claim 2 wherein the inner and outer ring devices are arranged in a circumferential configuration.

6. The drive device as recited in claim 1 wherein the bearing system includes two bearing devices situated at a distance from each other and which each support the rotor shaft radially inwardly with respect to the support section fixed to the housing.

7. The drive device as recited in claim 6 wherein the two bearing devices are situated on the end of the rotor shaft in an axial direction.

8. The drive system as recited in claim 6 wherein the bearing devices are situated in such a way that the bearing devices overlap in axial projection.

9. The drive system as recited in claim 8 wherein the bearing device overlap completely with the rotor shaft.

10. The drive device as recited in claim 6 wherein the rotor shaft has multiple channel sections running in an axial direction, the channel sections designed for cooling the bearing devices.

11. The drive device as recited in claim 6 wherein the bearing devices are designed as rolling bearings.

12. The drive device as recited in claim 11 wherein the rolling bearings are ball bearings.

13. An electric axle or hybrid transmission comprising the drive device as recited in claim 1.

14. The drive device as recited in claim 1 wherein the radially inwardly projecting section has cooling bore holes.

* * * * *